United States Patent [19]

Thrift et al.

[11] Patent Number: 4,457,170

[45] Date of Patent: Jul. 3, 1984

[54] FLUID-GAUGING PROBE ASSEMBLIES AND FLUID TANKS

[75] Inventors: Peter R. Thrift, Oakley; Neil R. Jacob, Basingstoke, both of England

[73] Assignee: Smiths Industries Public Limited Company, London, England

[21] Appl. No.: 372,764

[22] Filed: Apr. 28, 1982

[30] Foreign Application Priority Data

May 19, 1981 [GB] United Kingdom ................ 8115283

[51] Int. Cl.³ .......................................... G01F 23/26
[52] U.S. Cl. .............................. 73/304 C; 244/135 R; 361/284
[58] Field of Search ...................... 73/304 C; 361/284; 244/135 B, 135 R, 135 C

[56] References Cited

U.S. PATENT DOCUMENTS

| | | | |
|---|---|---|---|
| 2,884,948 | 5/1959 | Weiss | 244/135 C X |
| 2,916,541 | 12/1959 | Pullen | 361/284 X |
| 2,950,426 | 8/1960 | Frome | 361/284 |
| 3,043,542 | 7/1962 | Neuschotz | 244/135 R |
| 3,285,068 | 11/1966 | Morris | 73/304 C |
| 3,747,407 | 7/1973 | Wollman | 73/304 C |
| 3,797,311 | 3/1974 | Blanchard et al. | 73/304 C |
| 4,149,412 | 4/1979 | Fish | 73/304 C |

FOREIGN PATENT DOCUMENTS 2747326  5/1979  Fed. Rep. of Germany .... 73/304 C

OTHER PUBLICATIONS

USAAVLABS Technical Report 71-8, Crashworth Fuel System Design Criteria and Analysis, Johnson, Mar. 1971.

Primary Examiner—S. Clement Swisher
Assistant Examiner—Tom Noland
Attorney, Agent, or Firm—Pollock, Vande Sande & Priddy

[57] ABSTRACT

A capacitive fluid-gauging probe has a tubular electrode that is secured at its upper end to the wall of a reservoir by an integral mount moulded from a frangible plastics material. The mount has a collar that is fitted to the probe and from which extend radially three pairs of struts. The struts are joined at their outer ends with respective pillars that extend parallel to the probe. The pillars are joined with a plate that is secured to the wall of the reservoir above the probe. Domed plugs are inserted in both ends of the electrode to protect the wall of the reservoir which may be of flexible material. Preferably the ends of the probe are spaced from the reservoir walls. In operation, excessive force on the probe causes the struts to break, thereby allowing the probe to be displaced within the reservoir.

12 Claims, 2 Drawing Figures

U.S. Patent
Jul. 3, 1984
4,457,170
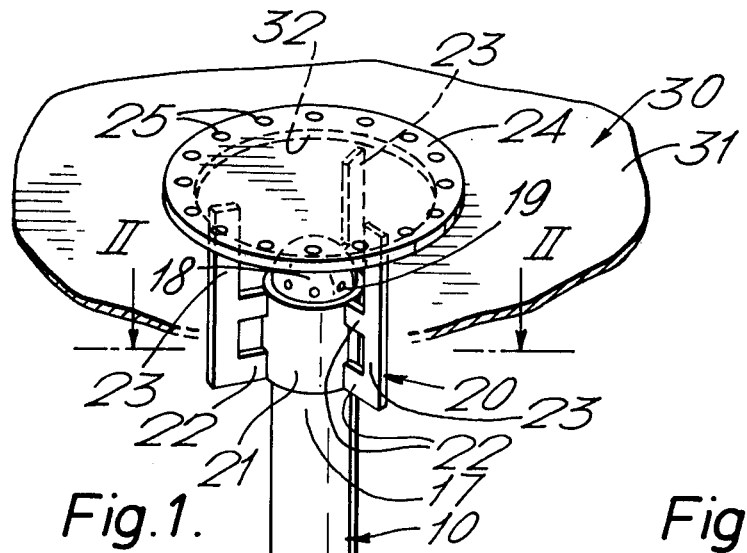
Fig.1.
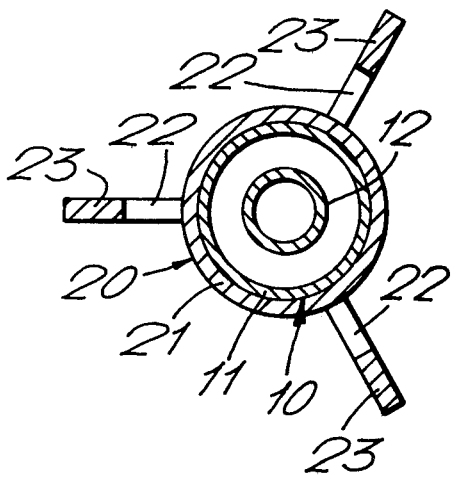
Fig.2.
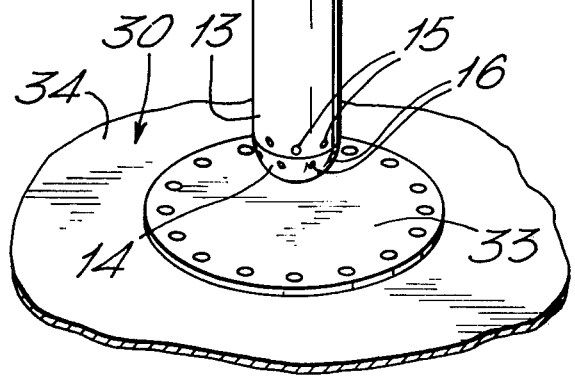

FLUID-GAUGING PROBE ASSEMBLIES AND FLUID TANKS

BACKGROUND OF THE INVENTION

This invention relates to fluid-gauging probe assemblies and to tanks including such assemblies.

The invention is more particularly concerned with probes of the capacitive kind for measuring the height of fuel in the fuel tank of a vehicle.

Conventional capacitive probes comprise concentric metal tubes, forming opposite plates of a capacitor, which are mounted rigidly within the tank and which are open to allow fuel to enter between the tubes to a height indicative of the fuel level in the tank. Change in fuel level causes a change in the capacitance of the probe which is used to provide an indication of fuel quantity. Probes of this kind are commonly used in aircraft of the fixed-wing type and in other aircraft, such as, helicopters.

One problem with such probes is that, because of the extremely high axial strength of a metal tube, the probe may pierce the wall of the fuel tank when the aircraft or other vehicle is damages in a crash. Many helicopters now use flexible fuel tanks of a rubber material which is inherently less dangerous in a crash since it can conform to accommodate deformation in the vehicle structure without damage to itself. Such tanks, however, are more likely to be pierced by the fuel probe, leading to leakage of fuel and a consequent fire hazard.

As a result of this, some manufacturers now require the probe to be designed so that it can break or deform to accommodate for change in shape of the fuel tank. One proposal is to weaken the probe at some point along its length by cutting out parts of the wall of the tube. Whilst this is effective in weakening the tube in flexure, that is when it is subjected to a lateral force, it still leaves the tube relatively strong as regards axial compression. There is also the problem that, when the probe breaks, sharp edges are produced at the break which can increase the risk of puncturing of the tank wall.

In an alternative arrangement, the probe is of a telescopic configuration comprising several tubes which can be slid one within the other on compression. This also has several disadvantages in that, because the telescoping tubes overlap one another at their joint, the capacitance of the probe in that region is affected and calibration rendered more difficult. The probe is also relatively strong in flexure and there is the problem that corrosion or fouling of the probe might prevent free sliding of the tubes within one another on axial compression. A telescoping arrangement is also more expensive since it is not generally possible to obtain tubes from stock which are a sliding fit within one another; instead the tubes must be fabricated especially.

BRIEF SUMMARY OF THE INVENTION

It is an object of the present invention to provide a probe assembly and a tank including such an assembly that avoids the above-mentioned problems.

According to one aspect of the present invention there is provided a fluid-gauging probe assembly for measuring the height of fluid in a reservoir, the assembly including an elongate element, and a mount mounting the elongate element with a wall of the reservoir such that the elongate element extends within the fluid, said mount including at least one frangible strut that projects radially from the elongate element and by which the element is mounted, and said strut being arranged to break when the assembly is subjected to excessive force so as thereby to allow the element to be displaced and avoid damage to the wall of the reservoir.

Because the frangible strut extends radially from the probe it is easily broken by force axially along the probe and also by lateral displacement of the other end of the elongate element.

The mount may include a plurality of struts spaced apart around the elongate element. The mount may also include a plurality of struts spaced apart along the elongate element. The mount means may include a collar that fits about said elongate element, said struts extending radially from said collar. The mount may also include at least one pillar that is arranged to be mounted with a wall of said reservoir and that extends substantially parallel to the elongate element, said strut or struts being joined with said pillar. The mount may be an integral construction of a frangible plastics material.

According to another aspect of the present invention there is provided a mount for a fluid-gauging probe, the mount being an integral construction of frangible material and comprising: a collar that is arranged to encircle said probe; a plurality of struts extending radially from said collar; a plurality of pillars, said pillars being joined at the outer end of said struts and extending substantially parallel to the axis of said collar; and a plate member joined to an end of said pillars, said plate member extending transversely of said collar, and said struts being arranged to break when the mount is subjected to excessive force.

According to a further aspect of the present invention there is provided a fluid reservoir including a fluid-gauging probe assembly for measuring the height of fluid in the reservoir, the assembly comprising an elongate element, and a mount supporting said elongate element such that it extends within fluid in said reservoir, said mount including at least one frangible strut that projects radially from the elongate element and by which the element is mounted, and said strut being arranged to break when the assembly is subjected to excessive force so as thereby to allow the element to be displaced and avoid damage to the wall of the reservoir.

A capacitive probe assembly, a mount for a probe assembly and a fuel tank including such an assembly, in accordance with the present invention will now be described, by way of example, with reference to the accompanying drawing.

BRIEF DESCRIPTION OF THE DRAWING

FIG. 1 is a perspective, partly cut-away view of the assembly in a tank; and

FIG. 2 is a cross-section to an enlarged scale along the line II—II of FIG. 1.

DETAILED DESCRIPTION

The probe assembly 1 comprises a conventional capacitive probe 10 and a frangible mount 20 secured to the upper end of the probe. The probe assembly 1 is mounted by the mount 20 to depend vertically within an aircraft fuel tank 30 and to break off when subjected to excessive force.

The probe 10 has two concentric aluminium tubes 11 and 12 which together form the plates of a capacitor. The gap between the inner and outer tubes 11 and 12 opens at the lower and upper ends of the probe 10 to permit free entry of fuel into the probe so that the probe is filled to a height that depends on the height of fuel within the tank 30. In this respect the assembly 1 is entirely conventional, change in fuel level varying the capacitance of the probe and thereby varying the output of the probe—for clarity the electrical connection to the probe has been omitted.

Within the lower end 13 of the outer tube 11 of the probe 10 there is secured a domed plug 14 of a hard, low friction material such as PTFE. Apertures 15 and 16 are formed around the wall of the outer tube 11 and the plug 14 respectively at its lower end to allow fuel to flow into and out of the probe 10.

At the upper end 17 of the probe 10 the mount 20 secures the probe to the upper wall or roof 31 of the fuel tank 30. The mount 20 is a unitary moulding of a frangible plastics material such as a 30% short-stranded glass-filled polyester, a glass-filled epoxy, or a phenolic plastics material, that is, a material which will break rather than being elastically deformed. The mount 20 has a cylindrical collar 21 that is secured firmly about the upper end 17 of the outer tube 11. From the collar 21 project three pairs of radial struts 22 spaced apart around the sleeve at equal distances. The struts 22 of each pair project from opposite ends of the sleeve, parallel to one another. At the outer end of the struts 22 each pair is linked by a pillar 23 that extends parallel to the probe 10 and that depends from a horizontal fixing plate 24. The plate 24 is of a circular shape, the three pillars 23 projecting downwardly from the plate from locations a short distance within its circumference. Around its periphery, the plate 24 is provided with a number of small mounting holes 25 through which the plate is bolted to the upper surface of the roof 31 of the tank 30. The entire mount 20, that is, the plate 24, pillars 23, struts 22 and sleeve 21 is a one-piece moulding although it is appreciated it could be formed in part by machining, or by joining several components.

The use of several struts 22, one above the other, gives the probe assembly 1 greater rigidity against lateral vibration than would be the case with a single strut of the same size.

Within the upper end 17 of the probe 10 there is secured another domed plug 18, having venting holes 19, similar to the plug 14 secured on the bottom end 13 of the probe. A small gap is left between the top of the plug 18 and the lower surface of the plate 24, sufficient to allow for enough movement of the probe 10 to break the mount 20.

The fuel tank 30 is of conventional form comprising a flexible bag of laminated rubber construction provided with suitable mounting fixtures (not shown) used to secure the tank at an appropriate location within an aircraft. The roof 31 has a circular aperture 32 through which the probe assembly 1 is mounted in the tank 30. A rigid plate 33 is mounted directly below, in line with the lower end 13 of the probe, on the lower wall or floor 34 of the tank, although this might not be necessary where the floor of the tank itself has sufficient strength.

In a crash, or heavy landing, the floor 34 of the tank 30 can be pushed upwards, towards the roof 31. The rigid plate 33 contacts the domed plug 14, the low-friction of which helps cause the lower end 13 of the probe 10 to be displaced laterally thereby twisting the mount 20. Because of the frangible nature of the material from which the mount 20 is made, very little deformation occurs before the struts 22 or pillars 23 break. As soon as this happens the upper end 17 of the probe 10 is pushed upwards, the domed plug 18 contacting the lower surface of the mounting plate 24, or the roof 31 of the tank 30, thereby helping to deflect the probe to a position in which its length can be accommodated. In this way, the height of the tank 30 can be greatly reduced without danger of the probe puncturing its wall. In general therefore, the geometry of the tank 30 will be sufficient to accept the length of the probe, except in those cases where the overall volume of the tank is reduced. In these cases, however, there will also be the risk of rupturing the tank by its increased internal pressure so the pressure of the probe will not significantly add to the danger.

The radial configuration of the struts 22 facilitate breakage of the mount 20 when the probe is subject to axial compression. Because the mount 20 breaks most readily at the struts 22, the ends of the broken probe assembly 1 will be substantially smooth and will not present a sharp surface that might cause puncturing. The nature of the material of the mount 20 also leads to a clean, unjagged break and thereby reduces the risk of puncture. The open construction of the struts 22 and pillars 23 reduces the risk that the part of the mount that remains secured to the tank will impede displacement of the upper end of the probe assembly 1.

It will be appreciated that the mount could take many different forms and that the radial struts could be provided of different shapes, sizes, materials and in different numbers.

Deflection of the probe assembly can be improved by mounting the probe so that it is inclined relative to the floor of the tank.

What we claim is:

1. A fluid-gauging probe assembly for measuring the height of fluid in a reservoir, the assembly comprising an elongate element, and a mount joined with one end of said elongate element, and with a wall of said reservoir to support said elongate element such that it extends within fluid in said reservoir, wherein said mount comprises: a plurality of frangible struts; means fixedly mounting said struts with said elongate element such that they project radially from the elongate element at locations spaced around the elongate element; and means fixedly mounting said struts with the wall of the reservoir so that said elongate element is supported by said struts with said one end of said elongate element spaced from the wall of said reservoir extending across the one end of said elongate member, and wherein the nature of the struts is such that they break when the assembly is subjected to excessive force, thereby allowing the elongate element to be displaced so as to avoid damage to the wall of the reservoir.

2. A fluid-gauging probe assembly according to claim 1, wherein said mount includes a plurality of struts spaced apart along the elongate element.

3. A fluid-gauging probe assembly according to claim 1, wherein the said means mounting said struts with said elongate element includes a collar that fits about, and is fixedly mounted with, the elongate element, said collar being joined to one end of each strut, and wherein the said means mounting each strut with the wall of the reservoir includes a pillar that is joined to the other end of each strut respectively and that extends parallel to said elongate element.

4. A fluid-gauging probe assembly according to claim 3, wherein said mount includes a plate member to which said pillar is joined, and wherein said plate member extends transversely of the elongate element across its said one end.

5. A fluid-gauging probe assembly according to claim 4, wherein the said one end of said elongate element is spaced from said plate member.

6. A fluid-gauging probe assembly according to claim 4, wherein said mount is an integral construction.

7. A fluid-gauging probe assembly according to claim 6, wherein said mount is of a frangible plastics material.

8. A fluid-gauging probe assembly according to claim 1, wherein said elongate element is a tubular metal electrode.

9. A fluid-gauging probe assembly according to claim 8, wherein said element is provided with a member at each end having a domed surface.

10. A fluid-gauging probe assembly for measuring the height of fluid in a reservoir, the assembly comprising a tubular capacitive electrode and a mount joined to one end of said electrode and to a wall of said reservoir to support said electrode such that it extends within fluid in said reservoir, wherein said mount is an integral construction of a frangible plastics material and comprises: a collar encircling, and being fixedly mounted with, said electrode close to one end thereof; a plurality of pairs of struts extending radially from said collar, said pairs being circumferentially spaced around said collar and each strut of said pair being axially spaced along said collar; a plurality of pillars extending generally parallel to said electrodes, said pillars being joined to the outer ends of both struts of each respective pair of struts; and a plate member joined to the ends of said pillars adjacent said one end of said electrode, said plate member extending transversely of said electrode, and being spaced therefrom, and wherein said struts are arranged to break when the assembly is subjected to excessive force, thereby allowing the electrode to be displaced so as to avoid damage to the wall of the reservoir.

11. A fluid reservoir for containing fluid includes a fluid-gauging probe assembly for measuring the height of fluid in the reservoir, the assembly comprising an elongate element, and a mount joined with said elongate element and with a wall of said reservoir to support said elongate element such that it extends within fluid in said reservoir, wherein said mount comprises: a plurality of frangible struts spaced apart around the elongate element; means mounting each said strut fixedly with one end of said elongate element such that they project radially from the elongate element; and means mounting each said strut with the wall of the reservoir so that said elongate element is supported by said struts with said one end of said elongate element spaced from the wall of said reservoir extending across the one end of said elongate element, and wherein the nature of the struts is such that they break when the assembly is subjected to excessive force, thereby allowing the elongate element to be displaced so as to avoid damage to the wall of the reservoir.

12. A mount for a generally tubular capacitive fluid-gauging electrode, the mount being an integral construction of a frangible plastics material and comprising: a generally tubular collar for encircling and for fixedly mounting with said electrode; a plurality of struts extending radially from said collar, said struts being spaced around said collar; a plurality of pillars, said pillars being joined to the outer ends of respective struts and extending parallel to the axis of said collar; and a plate member joined to an end of said pillars, said plate member extending transversely of, and being spaced from, said collar, wherein said struts are arranged to break when the mount is subjected to excessive force, thereby freeing the collar from the plate member.

* * * * *